(12) United States Patent
Lee et al.

(10) Patent No.: US 8,015,023 B1
(45) Date of Patent: Sep. 6, 2011

(54) PACKAGE OR MAIL DELIVERY NOTICE AND CONFIRMATION

(75) Inventors: Wing K. Lee, Overland Park, KS (US); Carl J. Persson, Olathe, KS (US)

(73) Assignee: Sprint Communications Company L.P., Overland Park, KS (US)

(*) Notice: Subject to any disclaimer, the term of this patent is extended or adjusted under 35 U.S.C. 154(b) by 305 days.

(21) Appl. No.: 11/847,038

(22) Filed: Aug. 29, 2007

(51) Int. Cl.
*G06Q 10/00* (2006.01)
*G06Q 30/00* (2006.01)
*G06F 7/00* (2006.01)
*G01C 21/00* (2006.01)

(52) U.S. Cl. ....... 705/1.1; 705/7.15; 705/26.9; 700/226; 701/200

(58) Field of Classification Search .............. 705/1.1, 705/7, 26; 700/226; 701/200
See application file for complete search history.

(56) References Cited

U.S. PATENT DOCUMENTS

| | | | | |
|---|---|---|---|---|
| 5,831,860 A * | 11/1998 | Foladare et al. | ............ | 700/219 |
| 6,694,580 B1 | 2/2004 | Hatzold | | |
| 7,543,735 B2 * | 6/2009 | Silver et al. | ............ | 235/375 |
| 7,647,231 B2 * | 1/2010 | Kuebert et al. | ............ | 705/1 |
| 2002/0143431 A1 * | 10/2002 | Sansone | ............ | 700/226 |
| 2002/0143490 A1 * | 10/2002 | Maeda et al. | ............ | 702/150 |
| 2003/0061109 A1 * | 3/2003 | Banerjee et al. | ............ | 705/26 |
| 2003/0065625 A1 * | 4/2003 | Rosenbaum et al. | ............ | 705/75 |
| 2003/0120505 A1 * | 6/2003 | Spiegel | ............ | 705/1 |
| 2003/0233190 A1 * | 12/2003 | Jones | ............ | 701/207 |
| 2004/0030604 A1 * | 2/2004 | Young | ............ | 705/26 |
| 2004/0073490 A1 * | 4/2004 | Shah et al. | ............ | 705/26 |
| 2004/0139033 A1 * | 7/2004 | Amato | ............ | 705/400 |
| 2005/0004877 A1 * | 1/2005 | McLellan et al. | ............ | 705/400 |
| 2006/0026047 A1 * | 2/2006 | Jones | ............ | 705/7 |
| 2006/0210073 A1 * | 9/2006 | Rojas et al. | ............ | 380/51 |
| 2006/0229895 A1 * | 10/2006 | Kodger | ............ | 705/1 |
| 2006/0245554 A1 | 11/2006 | Kessler et al. | | |
| 2007/0027732 A1 * | 2/2007 | Hudgens | ............ | 705/7 |
| 2007/0073551 A1 * | 3/2007 | Williams et al. | ............ | 705/1 |
| 2007/0156423 A1 * | 7/2007 | Foth et al. | ............ | 705/1 |
| 2008/0010127 A1 * | 1/2008 | Rojas et al. | ............ | 705/14 |
| 2008/0040133 A1 * | 2/2008 | Foth et al. | ............ | 705/1 |
| 2008/0046326 A1 * | 2/2008 | Horstemeyer | ............ | 705/14 |
| 2008/0061966 A1 * | 3/2008 | Nelson | ............ | 340/539.23 |
| 2008/0125959 A1 * | 5/2008 | Doherty et al. | ............ | 701/200 |
| 2008/0133261 A1 * | 6/2008 | Ray | ............ | 705/1 |
| 2010/0238023 A1 * | 9/2010 | Kahn et al. | ............ | 340/539.13 |

* cited by examiner

*Primary Examiner* — Fadey S Jabr (57) ABSTRACT

A system for providing notification related to package delivery is provided. The system comprises a recipient terminal configured to receive a notification of a package delivery, a delivery mobile terminal configured to determine its own location, and a server configured to send the notification to the recipient terminal based on the location of the delivery mobile terminal and based on information associated with the recipient terminal.

9 Claims, 10 Drawing Sheets

PACKAGE OR MAIL DELIVERY NOTICE AND CONFIRMATION

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Many articles and packages are delivered by delivery services to homes, offices, and other locations. Some delivery services prefer a rendezvous or face-to-face meeting to complete delivery and may experience one or more failed delivery attempts before successfully completing the rendezvous and delivery, thereby undergoing undesirable increased delivery costs associated with the failed delivery attempts. Many people have fluid schedules which may change from day-to-day and even between morning and afternoon. In some delivery circumstances a rendezvous is not needed to complete a delivery of an article, but the recipient of the article wants to know when article has been delivered to a remote location, for example to the recipient's home or office.

SUMMARY

In an embodiment a system for providing notification related to package delivery is provided. The system comprises a recipient terminal configured to receive a notification of a package delivery, a delivery mobile terminal configured to determine its own location, and a server configured to send the notification to the recipient terminal based on the location of the delivery mobile terminal and based on information associated with the recipient terminal.

In another embodiment, a method of scheduling package delivery is provided. The method comprises requesting a schedule for a delivery of a first package to a first primary recipient of the first package, analyzing information about the first primary recipient of the first package, and sending a notification of a time of the delivery of the first package to a designated recipient of the first package, if the analyzing information about the first primary recipient determines that the delivery of the first package can be completed successfully.

In another embodiment, another method of delivering packages is provided. The method comprises requesting a package delivery schedule, determining a present location of a package recipient, analyzing a historical data associated with the package recipient, providing the package delivery schedule to a delivery terminal based on the historical data associated with and the present location of the package recipient, communicating an estimated delivery time of a package to the package recipient, the estimated delivery time based on the package delivery schedule and a location of a delivery vehicle of the delivery service.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Several embodiments of a delivery scheduling and notification system are taught that provide opportunities for delivery services to reduce operating costs and provide convenient and flexible means for the recipient of a package or article delivery to coordinate a rendezvous with the delivery service to receive the package or article. The system includes an application server that mediates between the delivery service and the recipient. The application server can use a profile provided by the recipient, for example preferences about when and where a package should be delivered, to determine a recommended delivery time and delivery location to provide to the delivery service. The application server may also analyze an accumulated history of the recipient, for example information about where the recipient normally is at various times of the day and days of the week. This information, for example, may include how long it may typically take the recipient to travel from a first location to a second location, to use to determine the recommended delivery time and delivery location. The application server may have access to location information of the recipient and send a message to the delivery service that the recipient cannot rendezvous on a specific day to receive a package delivery, for example because the location information indicates the recipient is out-of-town.

In an embodiment, the delivery service can request the application server to generate a schedule for a sequence of deliveries to multiple recipients. The application server generates the schedule to promote an efficient delivery route for a delivery vehicle as well as accommodating the preferences and/or history of the multiple recipients of delivery articles. The application server may dynamically update and revise the schedule of deliveries throughout the day based on the location of the delivery vehicle as well as based on communications with one more recipients, for example based on confirmations or cancellations of rendezvous.

Figure 1:
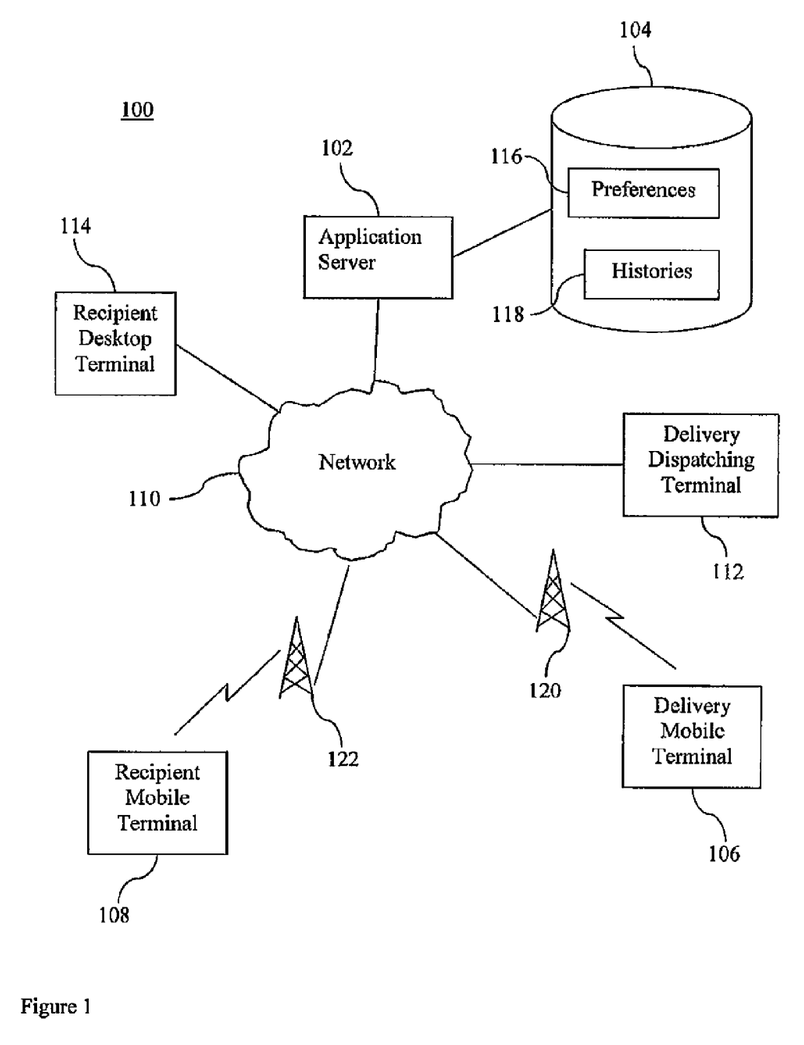
FIG. 1 is a block diagram of a system according to an embodiment of the disclosure.

Turning to FIG. 1, a system 100 for providing package and/or mail delivery notice and confirmation comprises an application server 102, a database 104, a delivery mobile terminal 106, a recipient mobile terminal 108, and a network 110. In some embodiments the system 100 may comprise additional components, for example a delivery dispatching terminal 112 and/or a recipient desktop terminal 114.

The application server 102 may be any general purpose computer system, as discussed in greater detail hereinafter. The application server 102 may comprise one computer or a plurality of computers, for example a server farm wherein many server computers cooperate to share a processing load. The application server 102 may comprise a plurality of computers which are located at different places, for example to provide geographical diversity and increased service reliability. The application server 102 executes one or more applications that provide services to various requestors, for example providing package delivery coordination and notification services to the delivery mobile terminal 106.

The database 104 stores information and makes information available to the application server 102 and possibly other server computers executing applications unrelated to the package delivery coordination and notification services. The information may include preferences of a package recipient, for example in a preferences 116 storage area or preferences entry. The preferences 116 may also be referred to as a profile or a recipient profile. The information may include a history of the package recipient, for example in a history 118 storage area or history entry. The database 104 may be implemented in a variety of manners known to those skilled in the art, including as a relational database, as an object-oriented database, and according to some other data storage/access principles. The database 104 may be composed of multiple separate databases, for example a first database containing the preferences 116 and a second database containing the history 118.

The delivery mobile terminal 106 is associated with a package or article delivery vehicle and may be, for example, a personal data assistant (PDA), a cell phone, a laptop or other electronic device carried by delivery service personnel in the delivery vehicle when covering a delivery route and delivering packages and/or articles. The delivery mobile terminal 106 is able to communicate with the network 110, for example via wireless communication with a first wireless base station 120 and from the first wireless base station 120 to the network 110. In an embodiment, the delivery mobile terminal 106 is capable of determining its own location and communicating that location to other devices, for example to the application server 102. In an embodiment the location of the delivery mobile terminal 106 is assumed to be approximately co-located with the associated delivery vehicle and the associated delivery service personnel, such that the location of the delivery mobile terminal 106 may be inferred to approximately represent the location of the associated delivery vehicle and the associated delivery service personnel.

The delivery mobile terminal 106 provides information to the delivery service personnel that promotes efficient delivery processes. For example, the delivery mobile terminal 106 may provide delivery vehicle location information to the application server 102 that enables the application server 102 to coordinate rendezvous of delivery service personnel with a recipient of one or more packages to increase the probability of successful delivery completion and/or package hand-off, thereby reducing the risk that the delivery vehicle will experience a failed delivery attempt. A failed delivery attempt may be accounted as a business loss or a waste of business money. An exemplary embodiment of the delivery mobile terminal 106 is described in greater detail hereinafter.

The recipient mobile terminal 108 is associated with the recipient of one or more packages or articles to be delivered by the delivery vehicle. The recipient mobile terminal 108 may be a cell phone, a PDA, a laptop computer or other electronic device. The recipient mobile terminal 108 is able to communicate with the network 110, for example through wireless communication with a second wireless base station 122 and from the second wireless base station 122 to the network 110. While described and illustrated as communicating with the network 110 via the second wireless base station 122, in an embodiment the recipient mobile terminal 108 may communicate with the network 110 via the first wireless base station 120, for example when the recipient mobile terminal 108 roams into the coverage area of the first wireless base station 120. The recipient mobile terminal 108 provides information that promotes efficient and/or convenient delivery processes. For example, the recipient mobile terminal 108 may receive a simple message service (SMS) message or a text message sent by the application server 102 requesting confirmation of rendezvous of the recipient with delivery service personnel to complete package delivery and/or package hand-off.

In an embodiment, the recipient mobile terminal 108 is capable of determining its own location and communicating that location to other devices, for example to the application server 102. In an embodiment the location of the recipient mobile terminal 108 is assumed to be approximately collocated with the recipient, such that the location of the recipient mobile terminal 108 may be inferred to approximately represent the location of the recipient. An exemplary embodiment of the recipient mobile terminal 108 is described in greater detail hereinafter.

The recipient desktop terminal 114 is associated with the recipient of one or more packages to be delivered by the delivery vehicle. The recipient desktop terminal 114 may be a personal computer (PC), a laptop computer, a workstation, or some other communications terminal located at a work or home location of the recipient or other location where the recipient is located. The recipient desktop terminal 114 provides information that promotes efficient and/or convenient package delivery, for example displaying an email message sent by the application server 102 requesting confirmation of rendezvous of the recipient with delivery service personnel to complete package delivery and/or package hand-off. The recipient desktop terminal 114 may be any general purpose computer system as discussed in greater detail hereinafter.

The delivery dispatching terminal 112 is associated with the delivery vehicle. The delivery dispatching terminal 112 may request package delivery coordination services from the application server 102, for example requesting a schedule or time for delivering a package or article and/or requesting a confirmation of rendezvous of the recipient with delivery service personnel to complete package delivery and/or package hand-off. The delivery dispatching terminal 112 may be any general purpose computer system as discussed in greater detail hereinafter.

The network 110 may be any communication network including a public data network (PDN), a public switched telephone network (PSTN), a private network, and/or a combination thereof. The network 110 may provide a variety of communication services or forms of communication including email communication, simple message service (SMS) message communication, text message communication, voice traffic communication, web content communication, and other communication services and communication content.

The first and second wireless base stations 120, 122 may be any of a cellular wireless base station, for example a Code Division Multiple Access (CDMA), Global System for Mobile Communications (GSM), and/or Universal Mobile Communications System (UMTS) cellular wireless base station; a World-wide Interoperable Microwave Access (WiMAX) base station; a WiFi access point; or other wireless access device. The first and second wireless base stations 120, 122 are in communication with the network 110, for example via wired communication links.

While one recipient of one package delivered by the delivery vehicle will be described in the following, it is understood that the delivery vehicle may deliver more than one package to the recipient and may deliver other packages to other recipients during the course of covering their delivery route. In an embodiment, package delivery by the delivery vehicle to one or more of these other recipients may not rely upon the system 100. In the following descriptions the delivery route of delivery service personnel is based on a day route, for example a route which may start with the delivery vehicle and delivery service personnel at a distribution facility in the morning, leaving the distribution facility, proceed to delivery of packages or articles from location to location, and completed by return of the delivery vehicle and delivery service personnel to the distribution facility later the same day in the evening, but other routes are contemplated by this disclosure. For example, following a route may begin on a first day, continue through the night, and complete on a second day. A route may consume multiple days to complete.

The application server 102 communicates with the database 104 through any of a variety of communication means including direct one-to-one connectivity, wide area network connectivity, local area network connectivity, or other communication connectivity. The application server 102 has communications connectivity to the network 110 and via the network 110 has connectivity to the delivery mobile terminal 106 via the first wireless base station 120 and to the recipient mobile terminal 108 via the second wireless base station 122. In an embodiment the application server 102 has communications connectivity to the delivery dispatching terminal 112 via the network 110. In an embodiment the application server 102 has communications connectivity to the recipient desktop terminal 114 via the network 110. In an embodiment the delivery mobile terminal 106 may have an interface enabling communications with the delivery dispatching terminal 112, for example through a docking cradle (not shown) configured as a peripheral device connected to the delivery dispatching terminal 112 or through a WiFi or Bluetooth wireless link.

Figure 2:
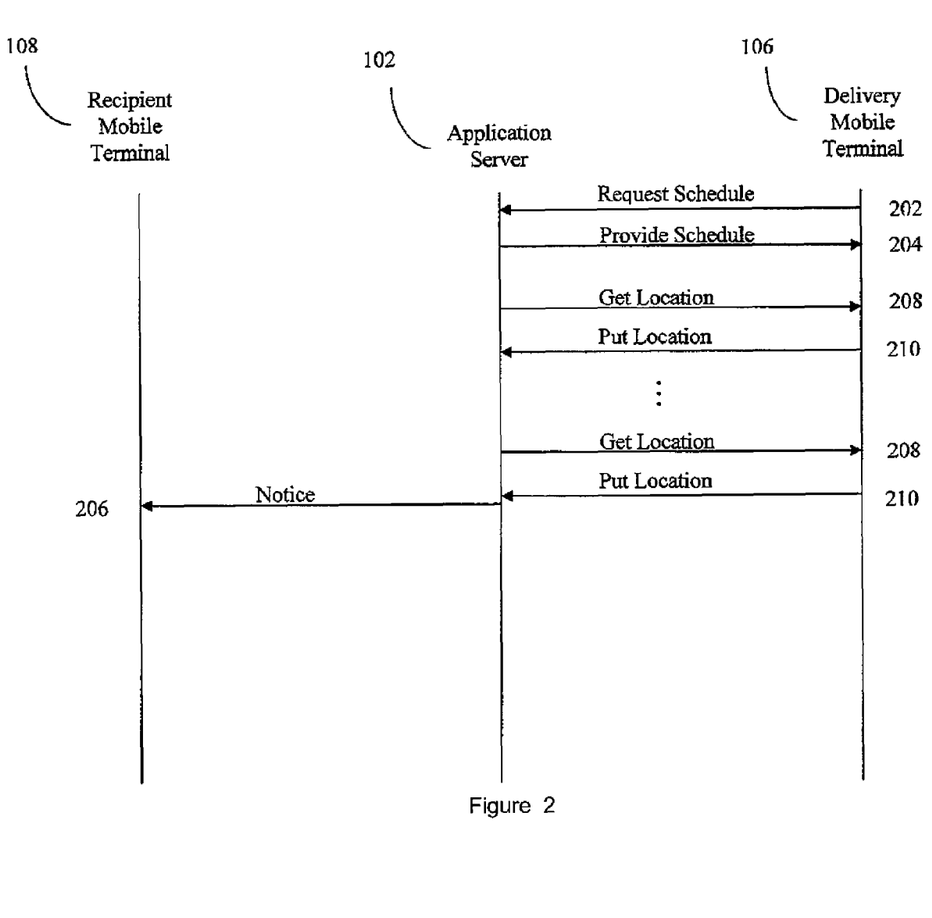
FIG. 2 is a message sequence diagram according to an embodiment of the disclosure.

Turning to FIG. 2, several different package delivery notification and scheduling interactions of the system 100 will be now discussed. The delivery mobile terminal 106 may send a schedule request message 202 to the application server 102 to set-up delivery of the package or delivery article to the recipient. The schedule request message 202 may identify the recipient of the package and/or a series of recipients of a number of packages. The application server 102 may reply by sending a schedule message 204 to the delivery mobile terminal 106. The schedule message 204 may include one or more components or fields each designating one of the recipients and a target package delivery time. In an embodiment the schedule message 204 may include a target delivery location for the package delivery for each recipient. In another embodiment, however, it may be known by other means to the delivery mobile terminal 106 what the target delivery location is for each of the recipients.

In an embodiment the application server 102 may determine a sequence of deliveries based on the series of recipients identified in the schedule request message 202 and based on accessing information about the recipients stored in the database 104. For example, the application server 102 may analyze the preferences 116 to determine a schedule of one or more recipients. For example, the preferences 116 for a first recipient may indicate package delivery is preferred during a specific time window on specific days. For example, the user may be at home on certain days of the week and at work on other days of the week, and the preferences 116 may contain this information or schedule. The preferences 116 may indicate a preferred package delivery location for different times and different days of the week. The application server 102 may analyze the preferences 116 to determine a recommended sequence of package deliveries. The ordered sequence of package deliveries may be implied by the series of target package delivery times. For example, a first package delivery scheduled at an earlier time is ordered before a second package delivery scheduled at a later time.

The schedule message 204 may indicate that the delivery to the recipient or a specific recipient cannot be successfully completed on that day, for example when the type of package delivery requires rendezvous of the recipient with delivery service personnel and the recipient is known to the application server 102 to be unable to rendezvous on that day. The application server 102 may know the recipient is unable to rendezvous on a specific day because the associated entry in the preferences 116 explicitly excludes this time.

Some types of package deliveries may not require rendezvous of the recipient with delivery service personnel. In this case the application server 102 may determine the sequence of delivery schedules or of target package delivery times for these non-rendezvous deliveries based in part on the scheduling of package deliveries that do require rendezvous during specific time intervals and in part based on reducing a travel distance and/or a travel time of the delivery vehicle.

In an embodiment the application server 102 sends a notification message 206 to the recipient mobile terminal 108. The notification message 206 may be sent by any of a variety of communications mechanisms or variety of forms of communication and may consist of an email, an automated phone message, a simple message service (SMS) message, a text message, a video clip, or other content.

This notification message 206 may serve as a reminder of the scheduling of the package delivery to the recipient that day and may be sent early in the day or at any time in the day before the time of the scheduled package delivery. Alternately, the notification message 206 may serve in part as a timing cue or trigger, where the notification message 206 is sent with enough lead time to permit the recipient to travel to the package delivery location, as for example in the case that rendezvous between the recipient and delivery service personnel is required or preferred. In an embodiment the application server 102 may determine an estimated travel time for the recipient to travel to the target delivery location, for example based on information in the history 118 associated with the recipient. For example, the application server 102 may store information about the recipient's average travel time of the recipient during specific time intervals on specific days, determine the approximate travel distance from a current location of the recipient, and estimate a travel time based on these two pieces of information. Alternatively, an average travel time may be part of the entry for the recipient in the preferences 116.

The average travel time may be provided by a separate source, for example an enterprise data mining tool in a telecommunications operating company that tracks some subscriber information such as mobile handset location with respect to time thereby generating velocities. The average travel time may be calculated over a window of time, which may be referred to as a sliding window average, for example over the most recent two weeks or over the most recent month or over some other effective interval of time.

In an embodiment the application server 102 is aware of the location of the delivery mobile terminal 106, and hence of the location of the delivery vehicle. The application server 102 may use the information about the location of the delivery mobile terminal 106 to appropriately time the sending of the notice message 206 to the recipient mobile terminal 108. For example, if the delivery vehicle experiences unusually heavy traffic or lengthy traffic halts, the application server 102 may determine from the changing location of the delivery mobile terminal 106 with respect to time that the notice message 206 should be sent to the recipient mobile terminal 108 later than initially calculated or determined. The application server 102 in this embodiment is able to dynamically adjust and re-determine the appropriate time to send the notice message 206 to the recipient mobile terminal 108.

The application server 102 may periodically poll the delivery mobile terminal 106 for its location, for example by sending a get location message 208 to the delivery mobile terminal 106 and by receiving a put location message 210 from the delivery mobile terminal 106. In an embodiment the application server 102 may not begin periodic polling until a threshold time, for example an earliest possible time for the delivery event, also taking into account an estimate of travel time of the recipient to the delivery location. Alternatively, the delivery mobile terminal 106 may periodically push its location to the application server 102 throughout the day and/or throughout the traversing of its route. The location of the delivery mobile terminal 106 may be determined by the delivery mobile terminal 106 by use of a global positioning system (GPS) functionality within the delivery mobile terminal 106, by a method of triangulating its position with respect to proximate wireless base stations, for example the first wireless base station 120 and other nearby wireless base stations (not shown), or by other means of determining position.

In an embodiment, the application server 102 may determine that an opportunity for alternative package delivery rendezvous exists based on the known location of the delivery mobile terminal 106 and on the known location of the recipient mobile terminal 108. For example, it may be that the recipient is running errands in a strip mall where the delivery vehicle is stopped to complete other package deliveries. The application server 102 may send the notification message 206 containing supplementary information that promotes the recipient contacting the delivery service to obtain package delivery by alternative package delivery rendezvous at the approximately co-location of the recipient and the delivery vehicle, for example at the strip mall. Alternatively, the application server 102 may handshake or communicate with the delivery mobile terminal 106 to promote the delivery service contacting the recipient, for example via email or phone call, to complete package delivery by alternative package delivery rendezvous while the recipient and the delivery vehicle are in close proximity, for example both located at the strip mall. This opportunistic rescheduling of the package delivery rendezvous may provide time and cost savings for both the recipient and the delivery service.

In another embodiment, the application server 102 may determine that an opportunity for alternative package delivery rendezvous exists based on the known location of the delivery mobile terminal 108 and based on a known history or pattern of movement of the recipient mobile terminal 106 or based on a recipient schedule stored in the preferences 116. For example, it may be that the recipient commonly visits a specific coffee shop in a business zone between 9 AM and 10 AM. The application server 102 may determine that the delivery mobile terminal 108 is located in the business zone, for example the delivery vehicle is making deliveries to other businesses in the business zone, and send the notification message 206 containing supplementary information that promotes the recipient contacting the delivery service to obtain package delivery by alternative package delivery rendezvous at the coffee shop or other distinctive location in the business zone. As in the above alternative example, this opportunistic rescheduling of the package delivery rendezvous may provide time and cost savings to either the recipient, the package delivery service, or both.

Figure 3:
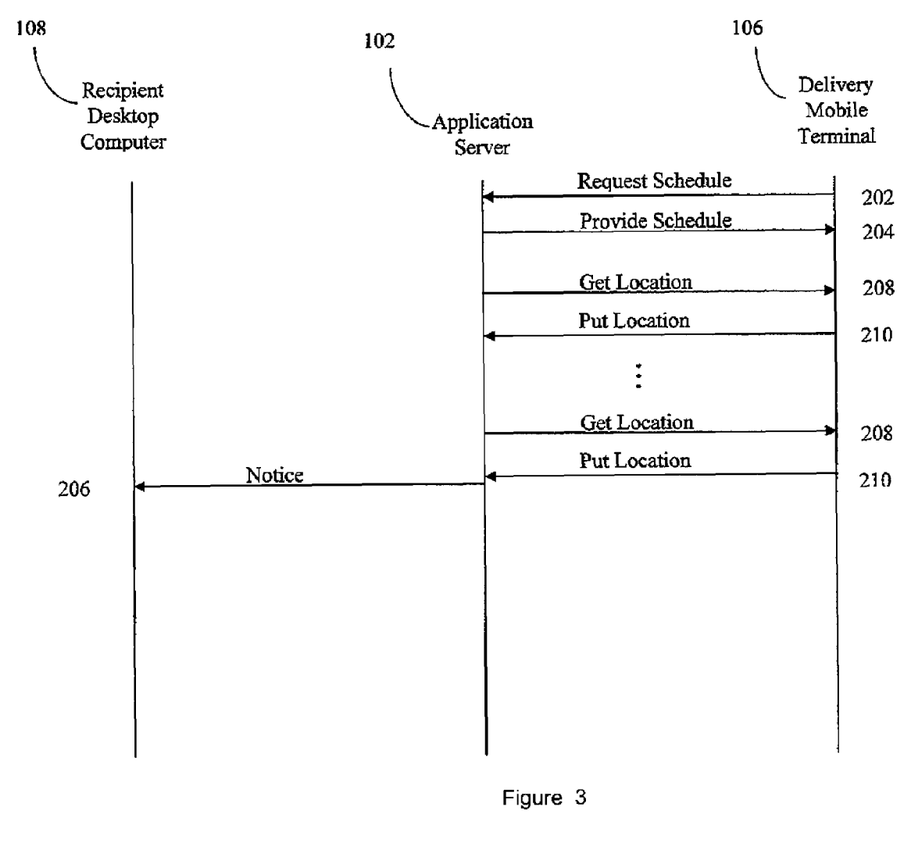
FIG. 3 is another message sequence diagram according to an embodiment of the disclosure.

Turning now to FIG. 3, a variation of the several different package delivery notification and scheduling interactions of the system 100 discussed above with reference to FIG. 2 is described. In FIG. 3 rather than the notification message 206 being sent to the recipient mobile terminal 108, the notification message 206 is sent to the recipient desktop terminal 114. The application server 102 may determine from the preferences 116 associated with the recipient that it is preferred that the notification message 206 be sent to, for example, the recipient desktop terminal 114. Alternatively, the application server 102 may determine to send the notification message 206 to the recipient desktop terminal 114 based on the location of the recipient mobile terminal 108 which is known to the application server 102, for example when the recipient mobile terminal 108, and implicitly the recipient, is located at a work location where the desktop terminal 114 is located. As above, the notification message 206 may be sent by any of a variety of message mechanisms and may consist of including but not limited to an email, a phone call, a SMS message, a video clip, or a text message. The other discussions about the possible different interactions among components of the system 100 apply equally in this case when the notification message is sent to the recipient desktop terminal 114.

Figure 4:
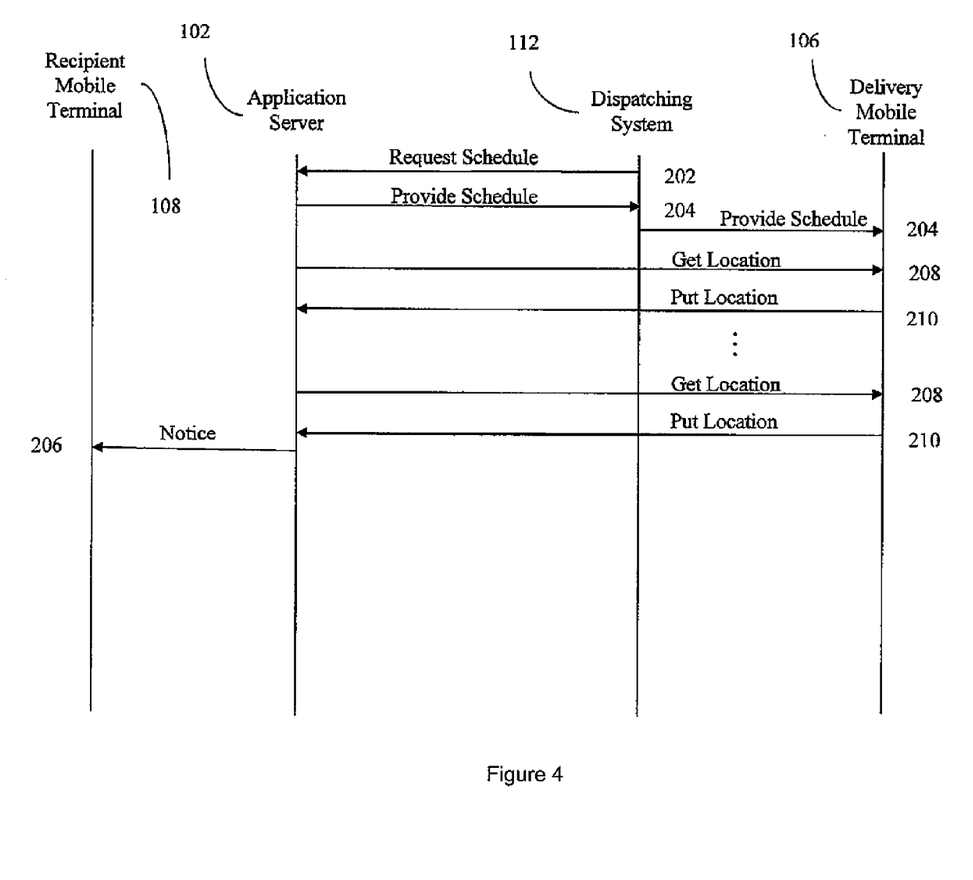
FIG. 4 is a different message sequence diagram according to an embodiment of the disclosure.

Turning now to FIG. 4, a variation of the several different package delivery notification and scheduling interactions of the system 100 discussed above with reference to FIGS. 2 and 3 is described. In FIG. 4 the delivery dispatching terminal 112 sends the schedule message 204 to the application server 102, and the application server sends the schedule message 204 to the delivery dispatching terminal 112. The delivery dispatching terminal 112 then forwards the schedule message 204 on to the delivery mobile terminal 106. Alternatively, the application server 102 may send the schedule message 204 directly to the delivery mobile terminal 106. The other discussions about the possible different interactions among components of the system 100 apply equally in this case.

Figure 5:
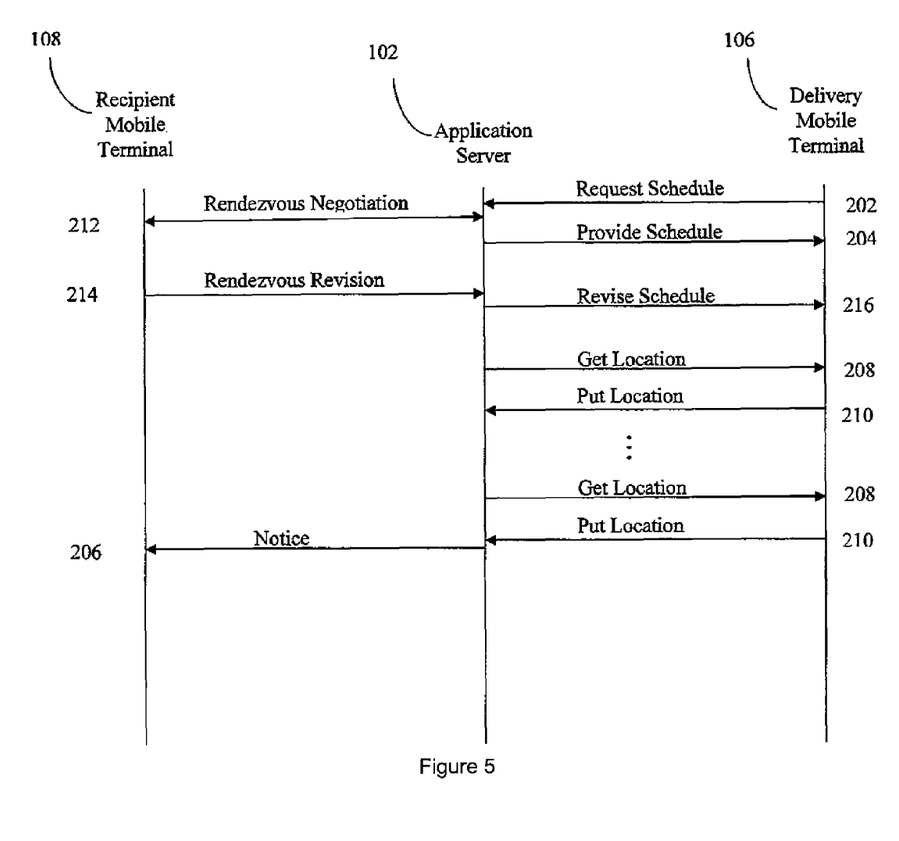
FIG. 5 is another message sequence diagram according to an embodiment of the disclosure.

Turning now to FIG. 5, a variation of the several different package delivery notification and scheduling interactions of the system 100 discussed above with reference to FIGS. 2, 3, and 4 is described. In FIG. 5 the application server 102 conducts a rendezvous negotiation 212 with the recipient mobile terminal 108 after the delivery mobile terminal 106 sends the request schedule message 202 to the application server 102. The rendezvous negotiation 212 may involve the application server 102 determining a first target package delivery schedule based on information associated with the recipient or the recipient mobile terminal 108 that the application server 102 accesses from the database 104. The recipient mobile terminal 108 may reply by accepting the first target package delivery schedule, by suggesting a second target package delivery schedule, or by rejecting the rendezvous attempt entirely, for example when a work schedule of the recipient does not allow to complete the rendezvous between the recipient and delivery service personnel.

The rendezvous negotiation 212, similarly, may involve the application server 102 determining a first target delivery location based on information associated with the recipient or the recipient mobile terminal 108 that the application server 102 accesses from the database 104. The recipient mobile terminal 108 may reply by accepting the first target package delivery location or suggesting a second target delivery location, for example when the recipient prefers to rendezvous at an uncustomary location, for example preferring to rendezvous with delivery service personnel at a work location of the recipient rather than at a home location.

In an embodiment the preferences 116 associated with the recipient, who might also be referred to as a primary recipient, may identify an order list of delivery locations, for example a most preferred delivery location associated with the primary recipient, a second most preferred delivery location associated with an alternate recipient, for example a spouse of the primary recipient, etc. If the recipient mobile terminal 108 rejects the rendezvous negotiation with the application server 102, the application server 102 may conduct a second rendezvous negotiation 212 with the next ordered alternate recipient. An alternative recipient that confirms or accepts a rendezvous request through the above described procedure may be referred to as a designated recipient or a proxy recipient.

On completion of the rendezvous negotiation 212 the application server 102 sends a schedule message 204 to the delivery mobile terminal 106 as described further above.

In an embodiment the recipient mobile terminal 108 may be able to arrange for the previously negotiated rendezvous to be revised by sending a rendezvous revision message 214 containing information about the preferred rendezvous location. The recipient mobile terminal 108 may also be able to send the rendezvous revision message 214 containing information changing the target package delivery time. The application server 102 may send a schedule revision message 216 to the delivery mobile terminal 106. The delivery mobile terminal 106 may dynamically respond to the schedule revision message 216 by changing its sequence of deliveries or delivery route. On the other hand, in specific situations the delivery mobile terminal 106 may not change its sequence of deliveries but rather just go to the changed rendezvous location.

The other discussions about the possible different interactions among components of the system 100 described above with reference to FIGS. 2, 3, and 4 apply equally in this case. A number of other possible interactions and combinations of interactions among the components of the system 100 are implied by the above descriptions, and all of these interactions are contemplated by this disclosure.

In an embodiment, the application server 102 may know that the primary recipient is out of town, based on a known schedule of the primary recipient and/or based on a known location of the recipient mobile terminal 108. If the primary recipient has designated a secondary recipient, a designated recipient, or a proxy recipient, for example in the preferences 116, the application server 102 may complete rendezvous negotiation with the proxy recipient. The application server 102 may be able to analyze a history and/or preferences of the proxy recipient which may be contained in the preferences 116 or the histories 118 in the database 104. The application server 102 may determine that the proxy recipient, for example a spouse of the primary recipient, is away from the home delivery address weekdays between about 8 AM to about 9 AM and between about 3 PM to about 4 PM. Additionally, the application server 102 may determine, based on history 118, that the proxy recipient is away from the home delivery address Monday, Wednesday, and Friday from about 1 PM to about 2 PM. While possibly unknown and irrelevant to the application server 102, this historical information may conform with a spouse dropping children off at school from about 8 AM to about 9 AM, picking children up from school at about 3 PM to about 4 PM, and going to the gym to work out Monday, Wednesday, and Friday from about 1 PM to about 2 PM. In this embodiment, the application server 102 may send a rendezvous negotiation message 212 to an email address of the proxy recipient suggesting a package rendezvous time of between 11 AM and 1 PM.

Figure 6:
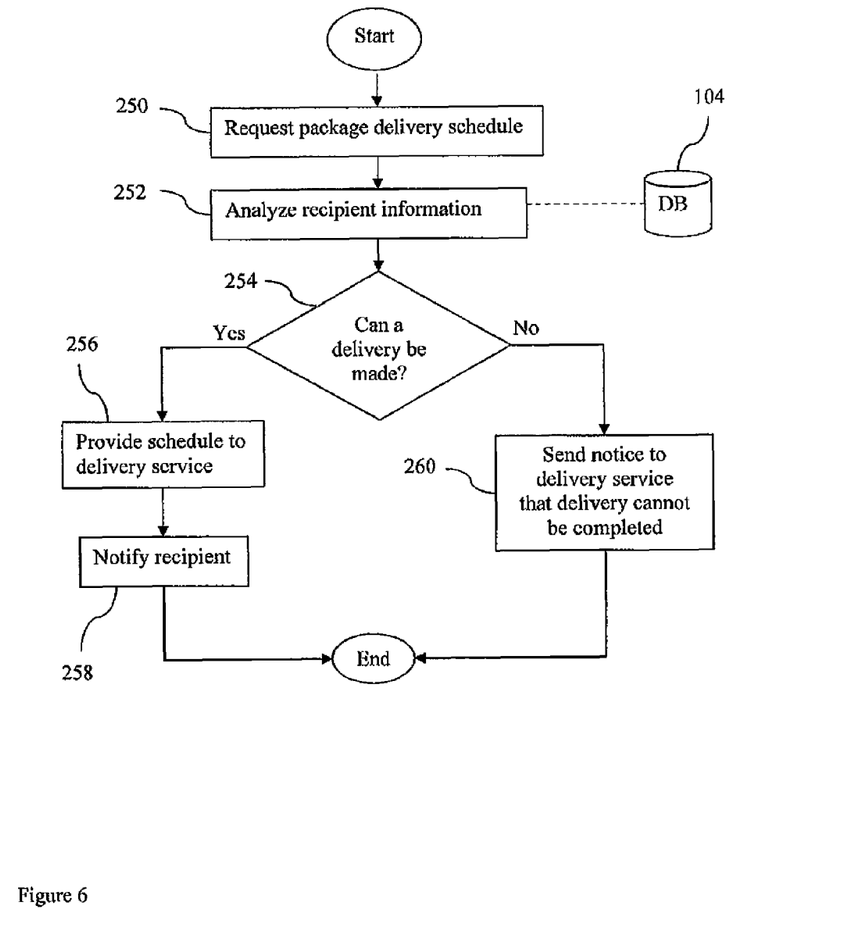
FIG. 6 is a flow chart illustrating a method according to an embodiment of the disclosure.

Turning now to FIG. 6 a method of scheduling package deliveries and/or providing notice to the recipient is described. The method begins at block 250, where a package delivery schedule is requested, as for example by the dispatching service. The request may be sent to the application server 102 by either the delivery mobile terminal 106 or the delivery dispatching terminal 112. The scheduling request may identify one or more recipients.

At block 252, recipient information is analyzed. In an embodiment the application server 102 accesses the database 104 to read the recipient information. The recipient information may include the preferences 116, the history 118, and/or other information related to the recipient. It may be determined that the projected delivery cannot be completed this day because the delivery requires rendezvous of the recipient with delivery service personnel and the recipient is unable to rendezvous because of a personal schedule conflict or because the recipient is out-of-town. Alternatively a desirable delivery time may be determined. The desirable delivery time may be determined based on a determination of an efficient delivery route, for example a delivery route that conserves time or distance traveled of the delivery service personnel.

At block 254 a decision is made. If the delivery can be completed, the method proceeds to block 256. In block 256, the desirable delivery time determined in block 252 is provided to the delivery service in the form of a schedule. The schedule may be provided by the application server 102 to either the delivery mobile terminal 106 or to the delivery dispatching terminal 112. At block 258, the recipient is notified of the scheduled package delivery, for example by the application server 102 sending a notification message to either the recipient mobile terminal 108 or the recipient desktop terminal 114. In an embodiment, the choice where to send the notification is made by the application server 102 based on preferences 116 associated with the recipient in the database 104. The notification may take various forms including an email, a telephone call, an SMS message, a text message, a video clip, and other content. In an embodiment the choice of the form of notification message sent is made by the application server 102 based on the preferences 116 associated with the recipient. In an embodiment the notification of the recipient is performed at such a time as to allow the recipient adequate time to travel to the package delivery location to rendezvous with delivery service personnel. In an embodiment, if the delivery does not require rendezvous of the recipient with the delivery service personnel, the notification of the recipient is performed at a time after the application server 102 determines the delivery has been completed, as for example by analyzing the position of the delivery mobile terminal 106 and deducing that the delivery has been completed.

In block 254, if it is determined the projected delivery cannot be completed, at box 260 a notice is sent to the delivery service, for example by the application server 102 to either the delivery mobile terminal 106 or the delivery dispatching terminal 112, that delivery to the specific recipient cannot be completed. This notice may be sent in the form of a schedule message wherein the schedule information indicates delivery cannot be completed on that day.

Figure 7:
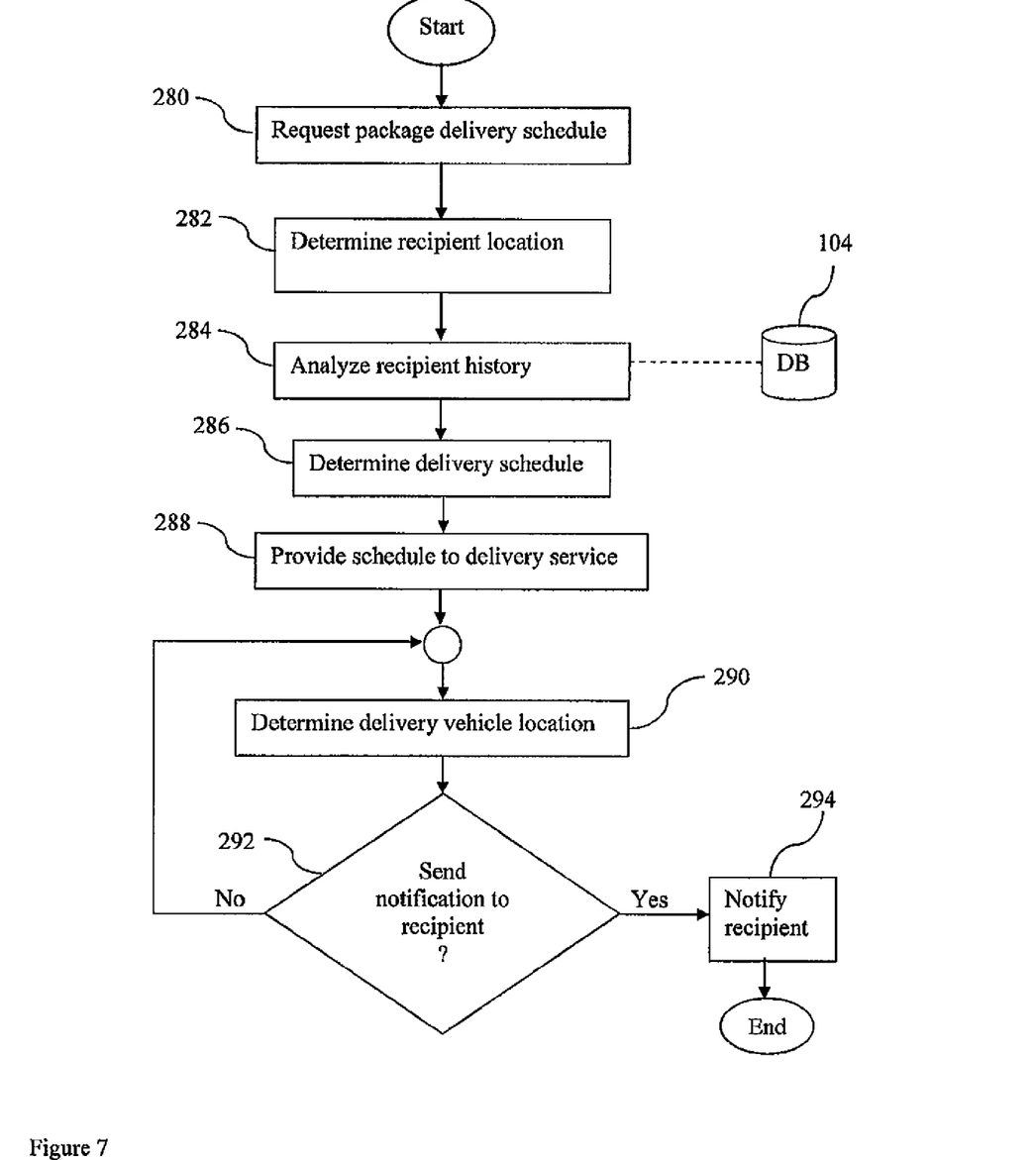
FIG. 7 is a flow chart illustrating another method according to an embodiment of the disclosure.

Turning now to FIG. 7 another method of scheduling package deliveries and/or providing notice to the recipient is described. The method begins at block 280 where a package delivery schedule is requested, as for example by the dispatching service. The request may be sent to the application server 102 by either the delivery mobile terminal 106 or the delivery dispatching terminal 112. The scheduling request may identify one or more recipients.

At block 282, the location of the recipient is determined, for example by the application server 102. The location of the recipient may be determined by the determining the location of the recipient mobile terminal 106 or by some other means, for example by daily schedule information associated with the recipient in the preferences 116.

At block 284, recipient history information is analyzed, for example the history 118 is analyzed by the application server 102. In an embodiment the application server 102 accesses the database 104 to read the recipient history information. At block 286, the delivery schedule is determined based on the analysis of the recipient history information, for example by the application server 102. At block 288, the schedule is provided to the delivery service, for example by the application server 102 sending a schedule message to the delivery mobile terminal 106 or the delivery dispatching terminal.

At block 290 the location of the delivery vehicle is determined, for example by the application server 102 determining the location of the delivery mobile terminal 106 or by some other means. The application server 102 may periodically poll the delivery mobile terminal 106 for its location. Alternatively, the delivery mobile terminal 106 may periodically push its location to the application server 102.

At block 292 a decision is made. If the application server 102 deems that notification should be sent to the recipient at that point, for example based on a determination of likely travel time of the recipient to the delivery location, the method proceeds to block 294 where notification is sent to the recipient, for example the application server 102 sends notification to the recipient mobile terminal 108 or to the recipient desktop terminal 114. In an embodiment, the choice where to send the notification is made by the application server 102 based on preferences 116 associated with the recipient in the database 104. The notification may take various forms including an email, a telephone call, an SMS message, a text message, a video clip, and other content. In an embodiment the choice of the form of notification message sent is made by the application server 102 based on the preferences 116 associated with the recipient.

At block 292 if the application server 102 does not deem that it is time to send notification to the recipient, the method returns to block 290. In an embodiment the method may not proceed from block 288 to block 290 until an appropriate time, for example an earliest possible notification time commensurate with providing sufficient advance notice to the recipient to travel to the delivery location to rendezvous with service delivery personnel. For example, it may waste processing resources to poll the location of the delivery vehicle throughout the morning when the earliest possible delivery time may be 2 PM in the afternoon. In this example, in an embodiment polling of the delivery vehicle location may not begin until, for example, 1 PM.

It may be determined that the projected delivery cannot be completed this day because the delivery requires rendezvous of the recipient with delivery service personnel and the recipient is unable to rendezvous because of a personal schedule conflict or because the recipient is out-of-town. Alternatively a desirable delivery time may be determined. The desirable delivery time may be determined based on a determination of an efficient delivery route, for example a delivery route that conserves time or distance traveled of the delivery service personnel.

Figure 8:
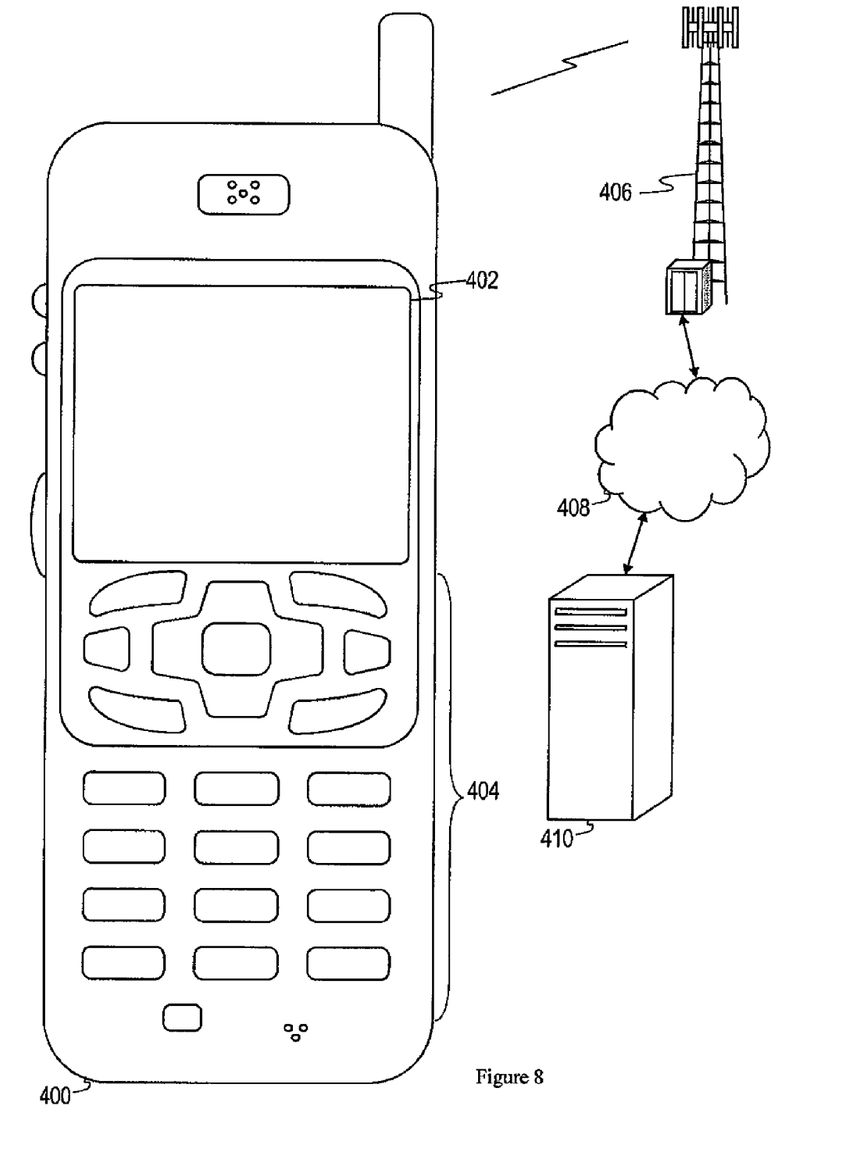
FIG. 8 is an illustration of a mobile device according to an embodiment of the disclosure.

Turning now to FIG. 8 a handset 400 is shown which is operable for implementing aspects of the present disclosure, but the present disclosure should not be limited to these implementations. For example, in an embodiment the handset 400 may be used to implement the recipient mobile terminal 108 and/or the delivery mobile terminal 106. Though illustrated as a mobile phone, the handset 400 may take various forms including a wireless handset, a pager, a personal digital assistant (PDA), a portable computer, a tablet computer, or a laptop computer. Many suitable handsets combine some or all of these functions. In some embodiments of the present disclosure, the handset 400 is not a general purpose computing device like a portable, laptop or tablet computer, but rather is a special-purpose communications device such as a mobile phone, wireless handset, pager, or PDA. The handset 400 may support specialized work assignments such as inventory control, job control, and/or task management functions.

The handset 400 includes a display 402 and a touch-sensitive surface or keys 404 for input by a user. The handset 400 may present options for the user to select, controls for the user to actuate, and/or cursors or other indicators for the user to direct. The handset 400 may further accept data entry from the user, including numbers to dial or various parameter values for configuring the operation of the handset. The handset 400 may further execute one or more software or firmware applications in response to user commands. These applications may configure the handset 400 to perform various customized functions in response to user interaction. Additionally, the handset 400 may be programmed and/or configured over-the-air, for example from a wireless base station, a wireless access point, or a peer handset 400.

The handset 400 may execute a web browser application which enables the display 402 to show a web page. The web page may be obtained via wireless communications with a cell tower 406, a wireless network access node, a peer handset 400 or any other wireless communication network or system. The cell tower 406 (or wireless network access node) is coupled to a wired network 408, such as the Internet. Via the wireless link and the wired network, the handset 400 has access to information on various servers, such as a server 410. The server 410 may provide content that may be shown on the display 402. Alternately, the handset 400 may access the cell tower 406 through a peer handset 400 acting as an intermediary, in a relay type or hop type of connection.

The handset 400 may provide support for receiving and sending email, SMS message, and text messages, and receiving video clips, for example to provide notification of package delivery or advance notice to promote timely rendezvous of the recipient with delivery service personnel to complete delivery of the package. The handset 400 may provide support for rendezvous negotiation.

Figure 9:
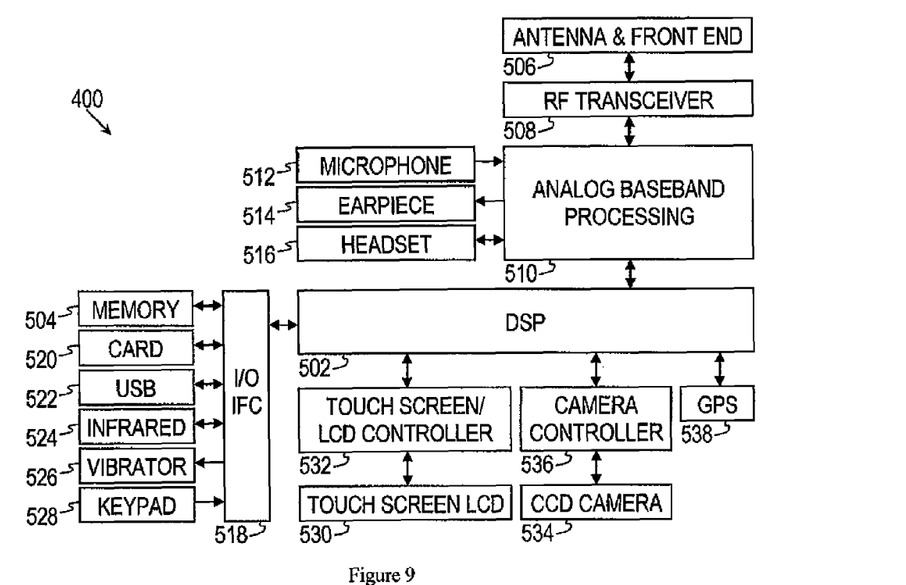
FIG. 9 is a block diagram of a mobile device according to an embodiment of the disclosure.

FIG. 9 shows a block diagram of the handset 400. While a variety of known components of handsets 400 are depicted, in an embodiment a subset of the listed components and/or additional components not listed may be included in the handset 400. The handset 400 includes a digital signal processor (DSP) 502 and a memory 504. As shown, the handset 400 may further include an antenna and front end unit 506, a radio frequency (RF) transceiver 508, an analog baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a charge-coupled device (CCD) camera 534, a camera controller 536, and a global positioning system (GPS) sensor 538. In an embodiment, the handset 400 may include another kind of display that does not provide a touch sensitive screen. In an embodiment, the DSP 502 may communicate directly with the memory 504 without passing through the input/output interface 518.

The DSP 502 or some other form of controller or central processing unit operates to control the various components of the handset 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the handset 400 to send and receive information from a cellular network or some other available wireless communications network or from a peer handset 400. In an embodiment, the antenna and front end unit 506 may include multiple antennas whereby to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 506 may include antenna tuning and/or impedance matching components, RF power amplifiers, and/or low noise amplifiers.

The RF transceiver 508 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast fourier transforming (IFFT)/fast fourier transforming (FFT), cyclic prefix appending/removal, and other signal processing functions. For the purposes of clarity the description here separates the description of this signal processing from the RF and/or radio stage and conceptually allocates that signal processing to the analog baseband processing unit 510 and/or the DSP 502 or other central processing unit. In some embodiments the RF transceiver 508, portions of the antenna and front end 506, the analog baseband processing unit 510 may be combined in one or more processing units and/or application specific integrated circuits (ASICs).

The analog baseband processing unit 510 may provide various analog processing of inputs and outputs, for example analog processing of inputs from the microphone 512 and the headset 516 and outputs to the earpiece 514 and the headset 516. To that end, the analog baseband processing unit 510 may have ports for connecting to the built-in microphone 512 and the earpiece speaker 514 that enable the handset 400 to be used as a cell phone. The analog baseband processing unit 510 may further include a port for connecting to a headset or other hands-free microphone and speaker configuration. The analog baseband processing unit 510 may provide digital-to-analog conversion in one signal direction and analog-to-digital conversion in the opposing signal direction. In some embodiments at least some of the functionality of the analog baseband processing unit 510 may be provided by digital processing components, for example by the DSP 502 or by other central processing units.

The DSP 502 may perform modulation/demodulation, coding/decoding, interleaving/deinterleaving, spreading/despreading, inverse fast fourier transforming (IFFT)/fast fourier transforming (FFT), cyclic prefix appending/removal, and other signal processing functions associated with wireless communications. In an embodiment, for example in a code division multiple access (CDMA) technology application, for a transmitter function the DSP 502 may perform modulation, coding, interleaving, and spreading and for a receiver function the DSP 502 may perform despreading, deinterleaving, decoding, and demodulation. In another embodiment, for example in an orthogonal frequency division multiplex access (OFDMA) technology application, for the transmitter function the DSP 502 may perform modulation, coding, interleaving, inverse fast fourier transforming, and cyclic prefix appending and for a receiver function the DSP 502 may perform cyclic prefix removal, fast fourier transforming, deinterleaving, decoding, and demodulation. In other wireless technology applications yet other signal processing functions and combinations of signal processing functions may be performed by the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB interface 522 and the infrared port 524. The USB interface 522 may enable the handset 400 to function as a peripheral device to exchange information with a personal computer or other computer system. The infrared port 524 and other optional ports such as a Bluetooth interface or an IEEE 802.11 compliant wireless interface may enable the handset 400 to communicate wirelessly with other nearby handsets and/or wireless base stations.

The input/output interface 518 may further connect the DSP 502 to the vibrator 526 that, when triggered, causes the handset 400 to vibrate. The vibrator 526 may serve as a mechanism for silently alerting the user to any of various events such as an incoming call, a new text message, and an appointment reminder.

The keypad 528 couples to the DSP 502 via the interface 518 to provide one mechanism for the user to make selections, enter information, and otherwise provide input to the handset 400. Another input mechanism may be the touch screen LCD 530, which may also display text and/or graphics to the user. The touch screen LCD controller 532 couples the DSP 502 to the touch screen LCD 530.

The CCD camera 534 enables the handset 400 to take digital pictures. The DSP 502 communicates with the CCD camera 534 via the camera controller 536. The GPS sensor 538 is coupled to the DSP 502 to decode global positioning system signals, thereby enabling the handset 400 to determine its position. In another embodiment, a camera operating according to a technology different from Charge Coupled Device cameras may be employed. Various other peripherals may also be included to provide additional functions, e.g., radio and television reception.

Figure 10:
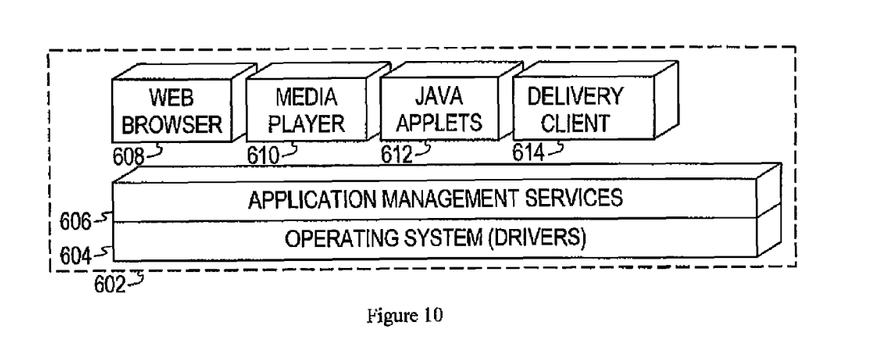
FIG. 10 is a block diagram of a software configuration for a mobile device according to an embodiment of the disclosure.

FIG. 10 illustrates a software environment 602 that may be implemented by the DSP 502. The DSP 502 executes operating system drivers 604 that provide a platform from which the rest of the software operates. The operating system drivers 604 provide drivers for the handset hardware with standardized interfaces that are accessible to application software. The operating system drivers 604 include application management services ("AMS") 606 that transfer control between applications running on the handset 400. Also shown in FIG. 10 are a web browser application 608, a media player application 610, and Java applets 612. The web browser application 608 configures the handset 400 to operate as a web browser, allowing a user to enter information into forms and select links to retrieve and view web pages. The media player application 610 configures the handset 400 to retrieve and play audio or audiovisual media. The JAVA applets 612 configure the handset 400 to provide games, utilities, and other functionality. In an embodiment, a delivery client 614 may be provided to support interactions with the application server 102 as described above. Email, SMS, and text messaging applications may also be provided.

Figure 11:
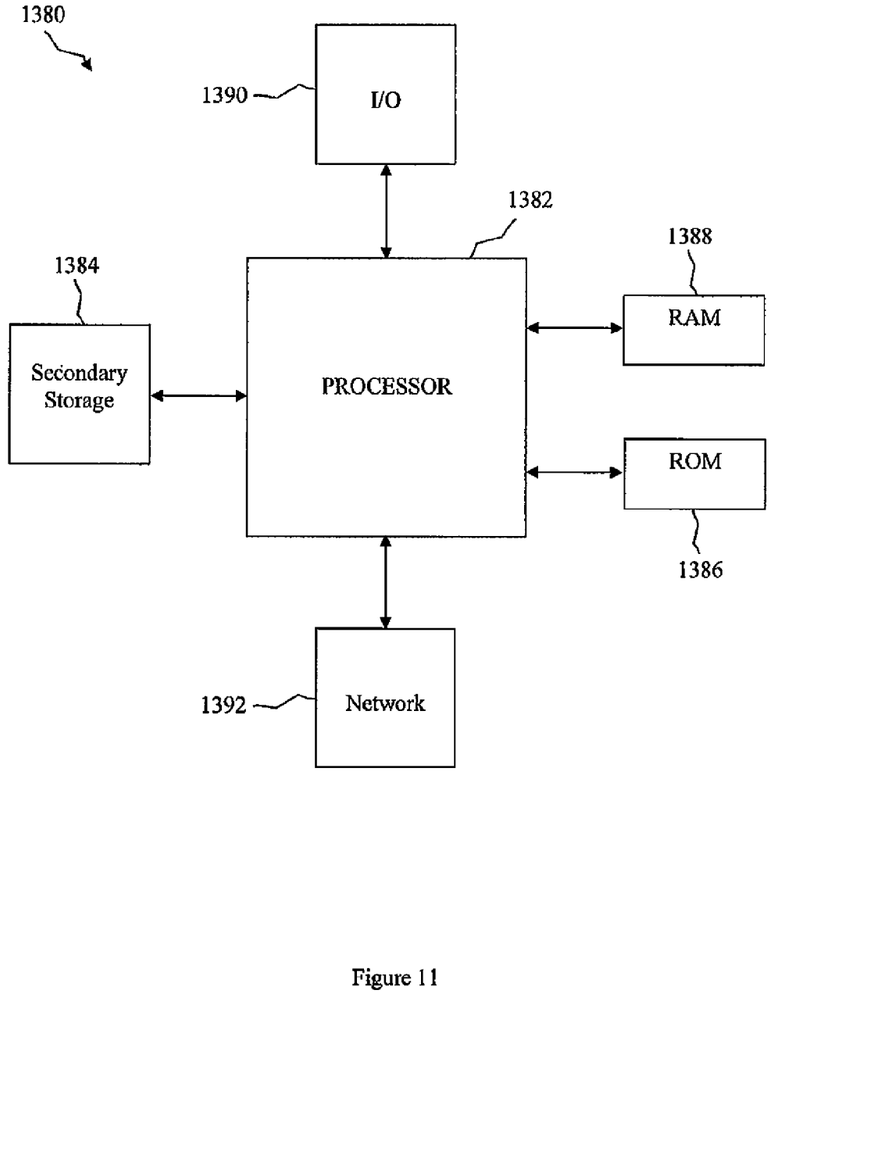
FIG. 11 illustrates an exemplary general purpose computer system suitable for implementing the several embodiments of the disclosure.

Portions of the system 100 described above may be implemented on any general-purpose computer with sufficient processing power, memory resources, and network throughput capability to handle the necessary workload placed upon it. For example, the application server 102, the delivery dispatching terminal 112, and the recipient desktop terminal 114 may be implemented on a general-purpose computer. FIG. 11 illustrates a typical, general-purpose computer system suitable for implementing one or more embodiments disclosed herein. The computer system 1380 includes a processor 1382 (which may be referred to as a central processor unit or CPU) that is in communication with memory devices including secondary storage 1384, read only memory (ROM) 1386, random access memory (RAM) 1388, input/output (I/O) 1390 devices, and network connectivity devices 1392. The processor may be implemented as one or more CPU chips.

The secondary storage 1384 is typically comprised of one or more disk drives or tape drives and is used for non-volatile storage of data and as an over-flow data storage device if RAM 1388 is not large enough to hold all working data. Secondary storage 1384 may be used to store programs which are loaded into RAM 1388 when such programs are selected for execution. The ROM 1386 is used to store instructions and perhaps data which are read during program execution. ROM 1386 is a non-volatile memory device which typically has a small memory capacity relative to the larger memory capacity of secondary storage. The RAM 1388 is used to store volatile data and perhaps to store instructions. Access to both ROM 1386 and RAM 1388 is typically faster than to secondary storage 1384.

I/O devices 1390 may include printers, video monitors, liquid crystal displays (LCDs), touch screen displays, keyboards, keypads, switches, dials, mice, track balls, voice recognizers, card readers, paper tape readers, or other well-known input devices. The network connectivity devices 1392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity devices 1392 may enable the processor 1382 to communicate with an Internet or one or more intranets. With such a network connection, it is contemplated that the processor 1382 might receive information from the network, or might output information to the network in the course of performing the above-described method steps. Such information, which is often represented as a sequence of instructions to be executed using processor 1382, may be received from and outputted to the network, for example, in the form of a computer data signal embodied in a carrier wave Such information, which may include data or instructions to be executed using processor 1382 for example, may be received from and outputted to the network, for example, in the form of a computer data baseband signal or signal embodied in a carrier wave. The baseband signal or signal embodied in the carrier wave generated by the network connectivity devices 1392 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 1382 executes instructions, codes, computer programs, scripts which it accesses from hard disk, floppy disk, optical disk (these various disk based systems may all be considered secondary storage 1384), ROM 1386, RAM 1388, or the network connectivity devices 1392.

While several embodiments have been provided in the present disclosure, it should be understood that the disclosed systems and methods may be embodied in many other specific forms without departing from the spirit or scope of the present disclosure.

The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method of scheduling package delivery, comprising:
    receiving a request, by a computer from a delivery service, to generate a schedule for a sequence of deliveries to multiple recipients, wherein one of the deliveries is a delivery of a first package to a first primary recipient of the first package;
    analyzing, by a computer, information about the first primary recipient of the first package, wherein the information about the first primary recipient of the first package identifies a designated recipient of the first package for the occasion that the first primary recipient is not able to receive the first package;
    determining, by a computer, that the first primary recipient is not able to receive the first package based on a present location of the first primary recipient;
    sending, by a computer, a notification comprising a time and a location of the delivery of the first package to the designated recipient of the first package in response to the determining that the first primary recipient is not able to receive the first package if the analyzing information about the first primary recipient determines that the delivery of the first package can be completed successfully to the designated recipient at the estimated time, wherein the delivery time and the delivery location are based on a historical data comprising a pattern of movement of the designated recipient, wherein the sending of the notification takes place at a time determined to allow for the designated recipient to travel to the delivery location, and wherein the time determined to allow for the designated recipient to travel to the delivery location is calculated by a computer based on an average travel time of the designated recipient during specific time intervals on specific days and an approximate travel distance from a current location of the designated recipient to the delivery location;
    receiving, by a computer, a response from the designated recipient responsive to the notification of the delivery of the first package, wherein the response rejects the notification or suggests a different delivery location or a different delivery time of the first package; and
    dynamically updating, by a computer, the schedule for the sequence of deliveries to multiple recipients based on the response from the designated recipient.

2. The method of claim 1 wherein one of the deliveries is a delivery of a second package to a second primary recipient of the second package, and further including, analyzing, by a computer, information about the second primary recipient of the second package; and
    sending, by a computer, a notification to the delivery service that the delivery of the second package cannot be completed, if the analyzing information about the second primary recipient determines that the delivery of the second package cannot be completed successfully.

3. The method of claim 2 wherein the analyzing information about the second primary recipient determines that the delivery of the second package cannot be completed successfully based on a preferences data comprising a schedule of the second primary recipient.

4. The method of claim 2 wherein the analyzing information about the second primary recipient determines that the delivery of the second package cannot be completed successfully based on a present location of the second primary recipient.

5. The method of claim 1 further including providing, by a computer, the schedule to the delivery service.

6. The method of claim 1 wherein the information about the first primary recipient of the first package identifies a form for providing the notification that is one of an email, a telephone call, a simple message service (SMS) message, a video clip, and a text message.

7. The method of claim 1 wherein the time determined to allow for the designated recipient to travel to the delivery location is further based on a present location of a package delivery vehicle associated with a delivery service.

8. The method of claim 1 wherein the notification of the delivery of the first package to the designated recipient of the first package is sent to one of a mobile terminal and a desktop terminal based on a preference data associated with the designated recipient.

9. The method of claim 1 wherein the notification of the delivery of the first package to the designated recipient of the first package is sent to one of a mobile terminal and a desktop terminal based on a present location of the designated recipient.

* * * * *